US006880228B2

(12) United States Patent
Bolotinsky et al.

(10) Patent No.: US 6,880,228 B2
(45) Date of Patent: Apr. 19, 2005

(54) METHOD FOR MANUFACTURING A THREE-PHASE TRANSFORMER

(75) Inventors: Yuri Bolotinsky, Netanya (IL); Alexander Rubshtein, Ashkelon (IL); Michael Savulkin, Netanya (IL); Eliezer Adar, Even Yehnda (IL)

(73) Assignee: A.T.T. Advanced Transformer Technologies, Ltd., Even Yehuda (IL)

( * ) Notice: Subject to any disclaimer, the term of this patent is extended or adjusted under 35 U.S.C. 154(b) by 539 days.

(21) Appl. No.: 09/843,779

(22) Filed: Apr. 26, 2001

(65) Prior Publication Data

US 2003/0112111 A1 Jun. 19, 2003

Related U.S. Application Data

(63) Continuation-in-part of application No. PCT/IL99/00562, filed on Oct. 25, 1999, and a continuation-in-part of application No. PCT/IL00/00243, filed on Apr. 27, 2000.

(30) Foreign Application Priority Data

Oct. 26, 1998 (IL) ............................................... 126748

(51) Int. Cl.[7] ........................ H02K 15/00; H02K 15/14; H02K 15/16

(52) U.S. Cl. .......................... 29/596; 29/602.1; 29/605; 29/606; 29/609; 336/70; 336/184; 336/212; 336/219

(58) Field of Search ................................ 29/596, 602.1, 29/605, 606, 609; 336/70, 184, 212, 219

(56) References Cited

U.S. PATENT DOCUMENTS

| | | | | |
|---|---|---|---|---|
| 1,164,288 A | | 12/1915 | Kinsley | |
| 2,702,887 A | | 2/1955 | Joublanc | |
| 2,909,742 A | | 10/1959 | Lamberton | |
| 3,399,365 A | | 8/1968 | Vadim | |
| 3,684,991 A | * | 8/1972 | Trump et al. | 336/70 |
| 4,338,657 A | | 7/1982 | Lisin et al. | |
| 4,413,406 A | | 11/1983 | Bennett et al. | |
| 4,433,474 A | * | 2/1984 | Hemmat | 29/605 |
| 4,639,705 A | | 1/1987 | Beisser | |
| 4,893,400 A | | 1/1990 | Chenoweth | |
| 5,168,255 A | | 12/1992 | Poulsen | |
| 5,329,270 A | | 7/1994 | Freeman | |
| 5,398,402 A | | 3/1995 | Valencic et al. | |
| 5,441,783 A | | 8/1995 | Silgailis | |

FOREIGN PATENT DOCUMENTS

| | | |
|---|---|---|
| CH | 483707 | 2/1970 |
| EP | 0151 048 | 8/1985 |

(Continued)

*Primary Examiner*—A. Dexter Tugbang
(74) *Attorney, Agent, or Firm*—Greer, Burns & Crain, Ltd.

(57) ABSTRACT

A three-phase transformer and a method of its manufacture are presented. The transformer comprises a magnetic circuit and three coil blocks. The magnetic circuit comprises two spaced-apart, parallel, plate-like elements; and three spaced-apart, parallel column-like elementary circuits. Each of the column-like elementary circuits carries the corresponding one of the three coil blocks, and serves for the corresponding one of the three phases. The column-like elementary circuits are substantially perpendicular to the plate-like elements, and are enclosed therebetween such as to form a spatial symmetrical structure about a central axis of the transformer. Each of the column-like elementary circuits is substantially a toroid in the form of a multi-layer structure formed by winding a predetermined number N of packages of magnetic strips about a central axis of the toroid, each package being composed of a predetermined number n of layers formed by n strips placed on top of each other.

16 Claims, 9 Drawing Sheets

FOREIGN PATENT DOCUMENTS

| | | | |
|---|---|---|---|
| FR | 1311248 | * | 5/1961 |
| FR | 1311248 | | 10/1961 |
| FR | 1401396 | | 4/1964 |
| GB | 830094 | | 3/1960 |
| GB | 1164288 | | 9/1969 |
| GB | 1229437 | * | 4/1971 |
| JP | 57-114215 | | 7/1982 |
| JP | 59-104110 | | 6/1984 |
| JP | 04-192510 | | 7/1992 |
| SU | 1274012 | | 11/1986 |
| SU | 1312653 | | 5/1987 |
| TW | 145021 | | 11/1990 |
| TW | 291177 | | 11/1996 |
| TW | 414900 | | 12/2000 |
| WO | 91/12960 | | 9/1991 |

* cited by examiner

METHOD FOR MANUFACTURING A THREE-PHASE TRANSFORMER

RELATED APPLICATION

This application is a Continuation In Part of Ser. Nos. PCT/IL99/00562 filed Oct. 25, 1999 and PCT/IL00/00243 filed Apr. 27, 2000.

FIELD OF THE INVENTION

This invention relates to a three-phase electrical transformer and a method for manufacturing thereof.

BACKGROUND OF THE INVENTION

A transformer is a known electrical device widely used for transferring energy of an alternating current in the primary winding to that in one or more secondary windings. It typically contains two or more electrical circuits comprising primary and secondary windings, each made of a multi-turn coil of electrical conductors with one or more magnetic cores coupling the coils by transferring a magnetic flux therebetween.

Presently known three-phase transformers usually utilize E+1 magnetic cores in a flat structure. Such a transformer includes several interconnected magnetic cores located in one plane. U.S. Pat. Nos. 4,893,400 and 5,398,402 disclose transformers having a magnetic core made of an amorphous metal strip wound into a core over a mandrel, with one leg of the resulting core being subsequently cut off and with forming the metal into a rectangular shape. This transformer is manufactured in the following manner. A piece of rectangular steel is wrapped around the outer periphery of the amorphous metal core. The amorphous metal is then annealed, and the core is encapsulated in a resinous coating, except the cut leg. This allows the opening of the cut leg. The layers of amorphous alloy strips of the two edges are oriented so that the edges define top and bottom surfaces, each surface having a discontinuity defining a distributed gap portion extending from the top surface to the bottom surface. The coils are placed over two long legs and the cut leg is closed. The joint is then sealed.

According to U.S. ’400, the sealing is made wit glass cloth and an ultraviolet-curable resin to provide the structure by the “fit and cure” method. This method is costly and labor-intensive. The transformers having amorphous metal cores manufactured according to this method cannot be repaired without causing damage to the core.

According to U.S. ’402, the sealing is made with a porous material such as woven cotton cloth or paper. The porous material is folded over the joint and secured into position. An additional piece of porous material is placed through the window of the core, wrapped around the core and secured there. Electrical grade steel is disposed around the transformer core and is closed around the core joint and tack-welded. This structure allows the cut leg to be opened to permit replacement of a defective coil. The operation, however, is time-consuming and labor-intensive.

U.S. Pat. No. 5,441,783 discloses a technique of the kind specified, wherein a coating used to impregnate the core joint is a porous material with a viscosity greater than about 100,000 cps and a bonding material with a viscosity of at least about 100,000 cps. The porous material comprises strands of fiber, and the bonding material is thixotropic epoxy. Although the coated cores have good magnet properties, their manufacture requires costly and complex operational steps. Moreover, the method of repairing these cores is labor-intensive.

Another common disadvantage of the transformers manufactured according to the techniques disclosed in the above patents is that annealed amorphous metals become extremely brittle, and thus break under mechanical stress, for example, during the stage of closing the core joint.

In the transformers of the above kind, a planar core structure is used. U.S. Pat. No. 4,639,705 discloses a transformer structure of another kind, having a spatial magnetic core system. This structure has advantages over the planar “E+1” structure, such as the reduced quantity of required magnetic materials (by about 20–30%), reduced volume of the transformer, reduced core losses (by about 20–30%), and balanced currents in the three phases of the primary windings. However, to manufacture a transformer in accordance with the technique disclosed in U.S. ’705, complex production technology as well as a complex repair technology, are required.

U.S. Pat. No. 4,639,705 discloses a transformer structure of another kind, having a spatial magnetic core system. This structure has advantages over the planar “E+1” structure, such as the reduced quantity of required magnetic materials (by about 20–30%), reduced volume of the transformer, reduced core losses (by about 20–30%), and balanced currents in the three phases of the primary windings. However, to manufacture a transformer in accordance with the technique disclosed in U.S. ’705, complex production technology as well as a complex repair technology, are required.

However, the commercially available amorphous ribbons (strips) are typically limited in width (up to 200 mm). Thus, the width of the strip is typically much smaller than that required for the height of a transformer core.

It is known from the disclosure in U.S. Pat. No. 2,909,742 that in order to obtain a desired height of the transformer core, a number of toroids can be stacked on top of each other. This technique, however, suffers from energy losses caused by unavoidable introduction of unwanted air gaps between each two adjacent toroids.

GB Patent No. 1,164,288 discloses a technique of fabricating a cylindrical magnetic core for a power transformer. The magnetic core is made from coiled strips, wherein the core is of greater axial dimension than the width of the strip. To manufacture the core, a plurality of layers of the magnetic steel strips is simultaneously coiled to form the cylindrical core. The sum of the width of the strips in each layer is equal to the axial dimension of the core, and at least one longitudinal edge of each strip is staggered in relation to those in adjacent turns of the resultant coil.

SUMMARY OF THE INVENTION

It is accordingly a need in the art to facilitate the manufacture and maintenance of a three-phase transformer, by providing a novel electrical transformer structure and a method of its manufacturing.

It is a major feature of the present invention to provide such a transformer that has higher efficiency and smaller magnetic core, and that uses lower quantities of materials per unit electrical power and/or has better maintainability, as compared to those of the conventional transformers of this kind.

A three-phase transformer according to the invention has a spatial symmetrical structure of a magnetic circuit. The magnetic circuit comprises two spaced-apart parallel plate-like elements, and three spaced-apart parallel column-like elementary circuits, which are substantially perpendicular to the plates and are enclosed therebetween forming a mutually symmetrical structure.

According to one aspect of the present invention, there is provided a method for manufacturing a three-phase transformer, the method comprising the steps of:

(i) producing two substantially plate-like elements of a magnetic circuit of the transformer in the form of toroids by winding at least one magnetic strip;

(ii) producing each of three column-like elementary circuits of said magnetic circuit in She form of toroid of a multi-layer store by winding predetermined number N of packages of magnetic strips about a central axis of the toroid, each package being composed of a predetermined number n of layers formed by n strips placed on top of each other;

(iii) forming each of the columns with a radial slot filled with an insulating material;

(iv) mounting a coil block on each of the columns obtained in step (iii) to form the corresponding one of the three phases of the transformer;

(v) mounting the coil blocks columns between the plate-like elements in a spaced-apart parallel relationship of the column-like toroids, such as to form a spatial symmetrical structure about a central axis of the transformer, spacers between the elements of the magnetic circuit of the transformer being filled with a material containing a magnetic powder.

According to another aspect of the invention, there is provided a three-phase transformer manufactured by the above method.

In general, for the purposes of the present invention amorphous strips or silicon steel strips (ribbons) can be used. The multi-layer structure of the column-like toroids provides for avoiding a problem associated with that ribbons available in the market may be limited in the width, for example, the width of an amorphous ribbon is typically less than the desired height of the transformer core. Such a multi-layer structure is composed of the predetermined number N of ribbon packages (stacks) aligned along the central axis of the toroid. Each package is composed of the predetermined number n of ribbons placed one on top of the other (i.e., aligned along an axis perpendicular to the central axis of the toroid) and shifted one with respect to the other a certain distance. Hence, each layer in the structure is composed of N strips (ribbons) arranged along the central axis, wherein air gaps naturally exist between each two adjacent strips of the layer. The layers are shifted with respect to each other such that each of the air gaps in one layer is overlapped by (n−1) strips of the other layers.

It should be understood that, since the heights (lengths) of plate-like and column-like toroids are different, the number of packages therein may be different. Generally, the plate-like toroid may be manufactured from a single strip, provided its width satisfies the height of the plate-like toroid. The provision of such packages is associated with the need to form the toroid of a desired height from several magnetic strips, caused by the limited width of the strip, and the unavoidable existence of air gaps between each two adjacent strips. If both, the plate-like and column-like toroids are made of strips packages, the packages are identical (i.e., comprises the same number of strip layers), while the number of packages is different for the flat and vertical toroids.

When manufacturing the transformer core from amorphous strips, the following steps should also be done:

annealing each of the plate-like toroids in a magnetic field directed perpendicular to a central axis of the toroid, and carrying out impregnation of each of the annealed plate like toroids; and prior to performing step (iii), annealing each of the three columns in a magnetic field directed along a central axis of the column, and carrying out impregnation of each of the column-like toroids.

Each of the column-like elementary circuits (toroids) may be formed of several axially mounted toroidal elements, each having a radial slot filled with an insulating material.

The elementary circuits are spaced from each other and from the plate-like elements by insulating spacers. All the spacers may be formed of plastic with filler of a magnetic powder with the concentration of 20–50%.

According to yet another aspect of the present invention, there is provided a three-phase transformer comprising a magnetic circuit formed of amorphous strips and three coil blocks, wherein the magnetic circuit comprises:

two spaced-apart, parallel, plate-like elements in the form of toroids; and three spaced-apart parallel column-like elementary circuits in the form of toroids, each column-like elementary circuit carrying the corresponding one of said three coil blocks and serving for the corresponding one of the three phases, wherein the column-like elementary circuits are substantially perpendicular to the plate-like elements and are enclosed therebetween such as to form a spatial symmetrical structure about a central axis of the transformer;

wherein at least the column-like toroids are in the form of identical multi-layer structures, each structure being composed of an array of N amorphous strip packages wound about the central axis of the toroid and aligned along said central axis, each package being a stack of n layers formed by n amorphous strips aligned along an axis perpendicular to said central axis and shifted with respect to each other a predetermined distance along said central axis such that each of the air gaps naturally existing between each two adjacent strips in the layer is overlapped by (n−1) strips aligned along the axis perpendicular to the central axis of the toroid; and each of the column-like toroids is formed with a radial slot filled with an insulating material.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF A PREFERRED EMBODIMENT

Figure 1:
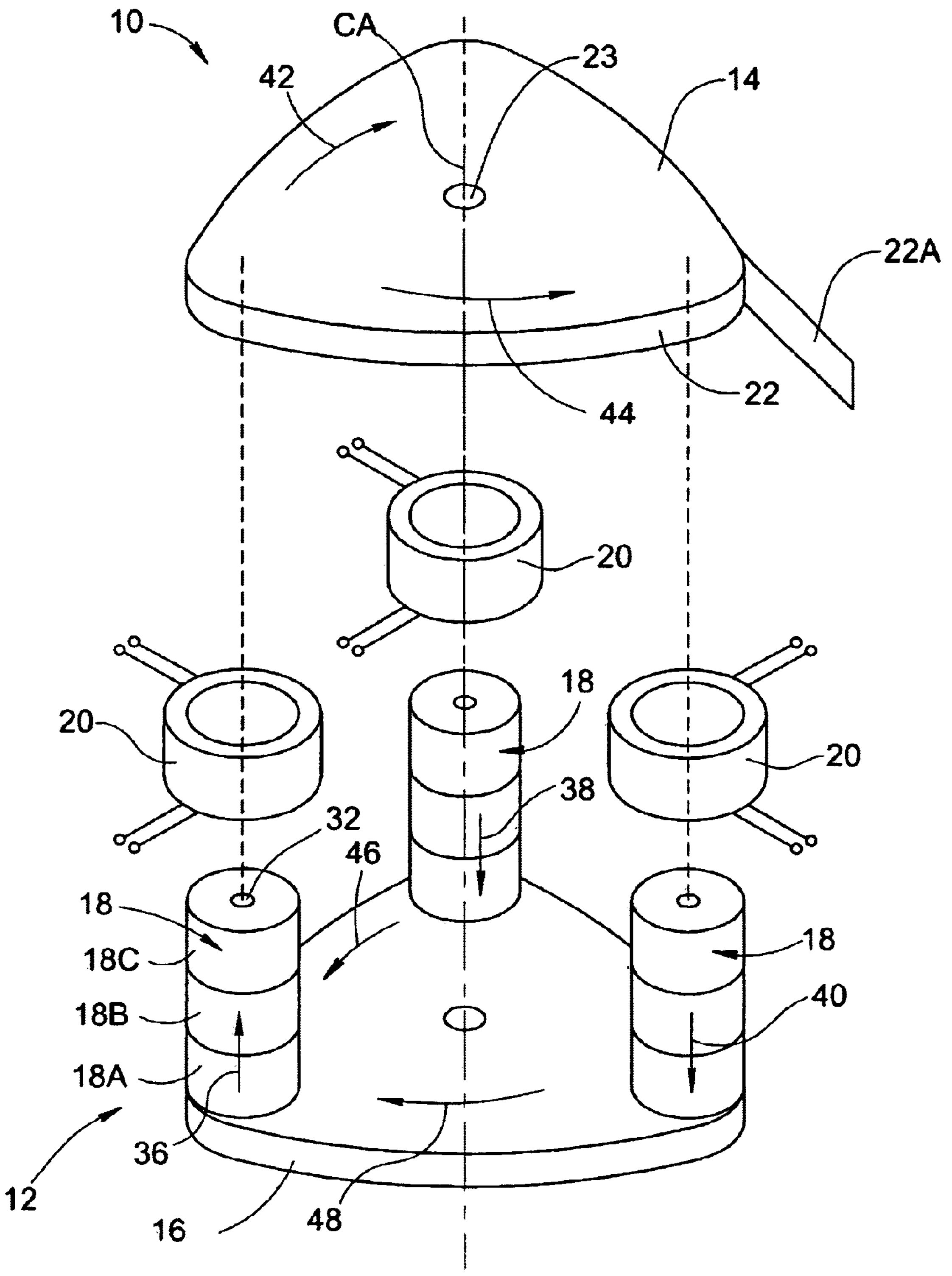
FIGS. 1 and 2 illustrate schematically exploded and assembled views of a three-phase transformer structure according to the invention.
Figure 2:
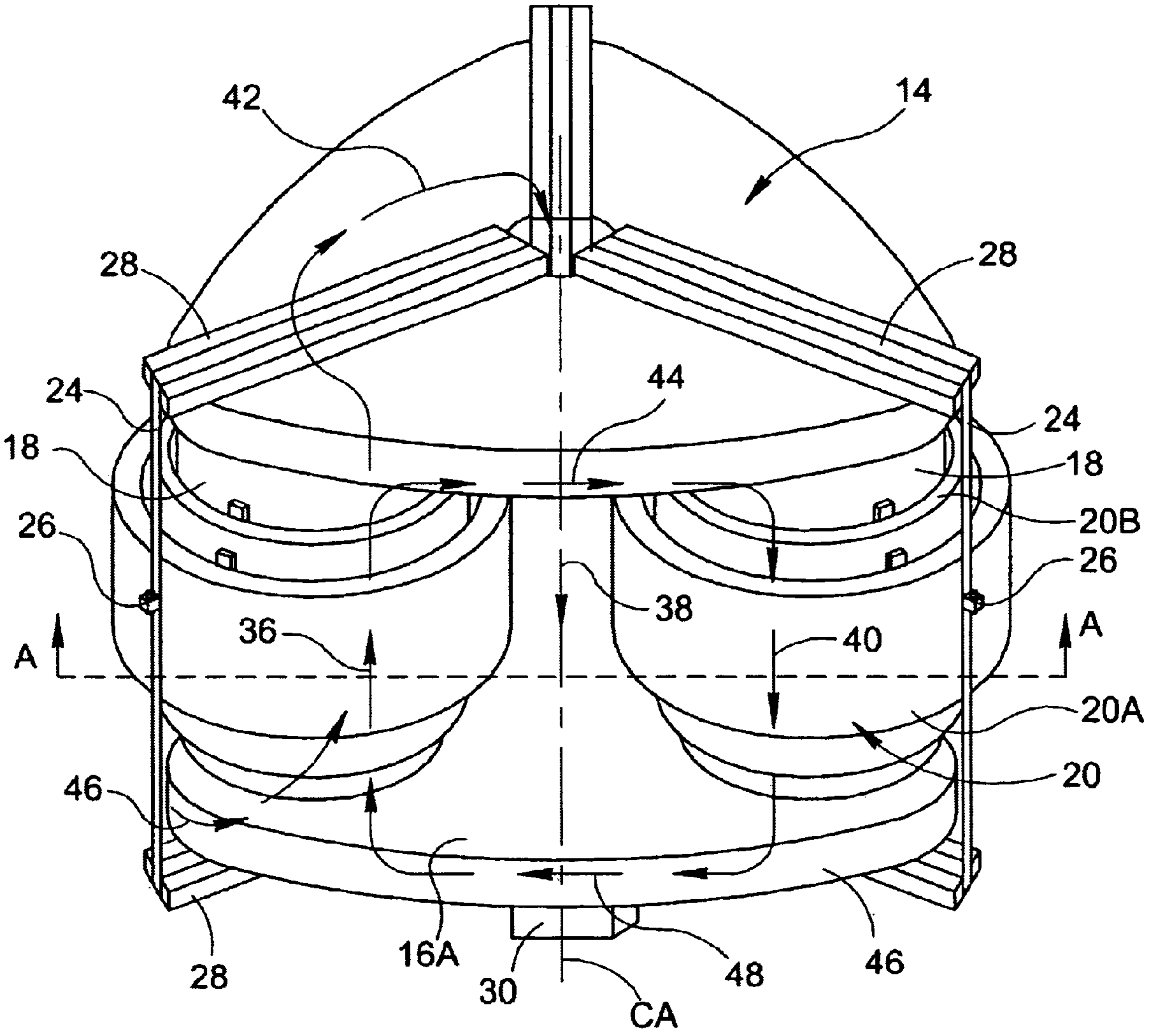

Referring to FIGS. 1 and 2, the main components of a three-phase transformer 10 constructed according to the present invention are illustrated. The transformer 10 comprises a magnetic circuit 12 formed by an upper plate-like element 14, a lower plate-like element 16, and tee parallel identical column-like elementary circuits, generally at 18. The magnetic circuit 12 is arranged such that the plates 14 and 16 are parallel to each other, and the columns 18 serve as supports between the plates, thereby forming a cage-like structure spatially symmetrical about a central axis CA. In the present example, each of the plates 14 and 16 is a toroid, and is made of amorphous ribbons 22 wound about a central hole 23 to form the planar toroid. Further provided are three coil blocks 20, each for mounting on a corresponding, one of the columns 18. As shown in FIG. 2, each of the coil blocks 20 includes a primary winding 20*a* and a secondary winding 20*b*. Thus, each phase of the transformer 10 is formed by the column-like elementary circuit 18 with the corresponding coil block 20 mounted thereon.

The transformer 10 has a modular structure, namely, the plates 14 and 16, and the columns 18 can be easily assembled together and disassembled, as will be described more specifically further below. When one of the plates 14 or 16 is removed, the coil blocks 20 can be removed as well, thereby enabling, for example, to repair the coil.

In the present example, each of the plates 14 and 16 has a generally triangular shape with rounded sides and corners. After forming the plate 14 of the desired shape and size, an excess-ribbon portion 22*a* is cut off. The amorphous ribbon 22 is made of an alloy having soft ferromagnetic properties, as required for the magnetic circuit of a transformer. Amorphous ribbon is known to have good ferromagnetic properties. The structure of the transformer 10 according to the invention allows for beneficial use of these properties in a practical transformer structure.

Each of the columns 18 is also a toroid. In the present example, each of the toroids 18 is formed of three toroidal element 18*a*, 18*b* and 18*c* stacked on top of each other. This construction enables to achieve a desired height of the column 18, notwithstanding the fact that the width of amorphous ribbon is typically limited. The desired height of the column-like elementary circuit 18 can be achieved by winding the toroid 18 from a predetermined number of layers, each formed by a plurality of magnetic strips, as will be described more specifically further below. Thus, the present invention allows for producing a transformer with any desired height of the column-like elementary circuit 18.

As shown in FIG. 2, the entire structure is held together with three de-mountable bands 24 (only two of them being seen in the figure), each having a screw (or spider) 26 to tighten the band. Structural members 28 are provided, each located between the corresponding one of the bands 24 and each of the plates 14 and 16. A base 30 supports the entire structure. An inner, upper surface 16*a* of the plate 16 is brought into contact with lower surfaces of the columns 18 to transfer magnetic fluxes therebetween, as will be described more specifically further below.

Figure 3:
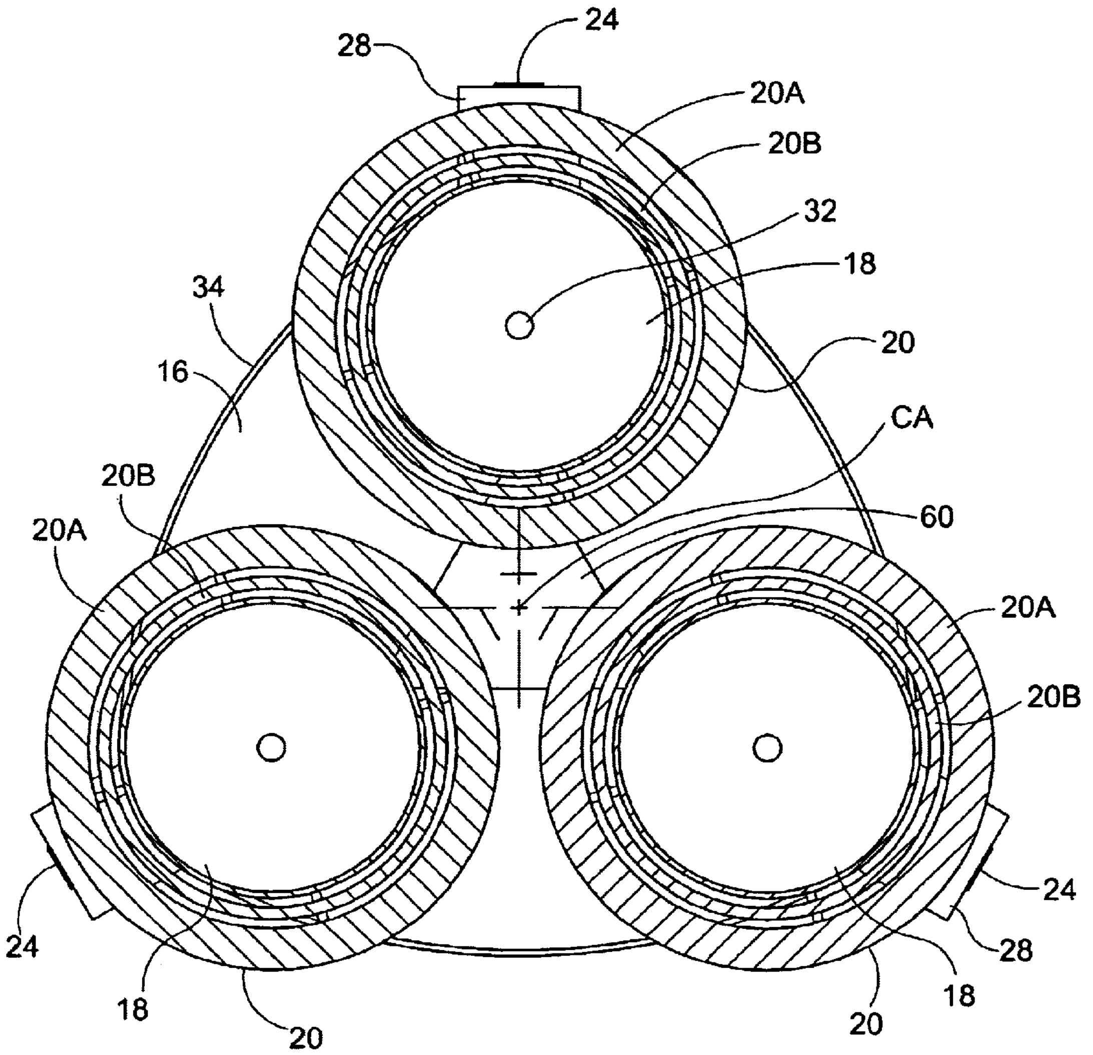
FIG. 3 is a section taken along lines A—A in FIG. 2.

FIG. 3 illustrates a section taken along line A—A of FIG. 2, showing more specifically the lower plate 16 and the three columns 18 of the magnetic circuit 12. Each column 18 is formed with a central hole 32, and the columns 18 are arranged symmetrically about the central axis CA. As shown, the structural member 28 is located between the corresponding one of the bands 24 and the plate 16. The plate 16 preferably has a protective coating 34 aimed at prolonging its life.

Turning back to FIGS. 1 and 2, the operation of the transformer 10 consists of the following. As a current passes through each primary winding 20*a* of the coil block 20, a magnetic flux is generated and propagates along the corresponding column 18 between the upper and lower plates 14 and 16. Arrows 36, 38 and 40 show fluxes generated in the three column 18, respectively. The magnetic flux flowing through the column 18 generates an induced voltage in the secondary winding 20*b* of the corresponding coil block 20. The device having this structure thus function as a three-phase transformer.

Thus, the electric current, for example, with the working frequency of 50 Hz, is supplied from a power source (not shown) to a terminal of coil of the primary winding 20*a*, and, whilst passing through the coil turns, creates the basic magnetic flux 36. Let us now consider the moment of passing of the magnetic flux along one phase of the transformer. Assuming, for example, that at a given moment the flux 36 flows up. Then, the flux 36 is divided into two identical fluxes 42 and 44 in the plate 14. These fluxes 42 and 44 flow along two identical portions of the toroidal plate 14, and, then, flow down through the two other cores 18. The flux 42 changes into flux 38, and the flux 44 changes into the flux 40 passing down through the columns 18. Then, the fluxes 38 and 40 flow along two equal paths of the toroidal plate 16. Whilst passing along the toroidal plate 16, the flux 38 changes into a flux 46, and the flux 40 changes into a flux 48. The fluxes 46 and 48 are transferred into the column 18 forming the sum flux 36, which flows up. Thus, the magnetic flux loop is closed. The fluxes of the other phases of the transformer flow in the similar way summing up the total magnetic flux.

As indicated above, the plates 14 and 16 could have a circular shape. In this case, the flux streams 42, 44, 46 and 48 will flow along circular paths therein. In the example of FIGS. 1 and 2, each of the plates 14 and 16 is shaped like an equilateral triangle with rounded sides and corners. This results in a shorter path for the flux streams in the plates 14 and 16 between the columns 18, i.e., the shape of the flux streams is closer to a straight line. This enables to achieve a lower magnetic reluctance, or better conductance of the magnetic flux. To manufacture each of the plate-like elements 14 and 16, the amorphous ribbon 22 is secured to a mandrel made of a non-magnetic material and having a triangular cross section, which is then rotated about its axis. When the desired size of the plate 16 is achieved, the plate is fixed in that state using either impregnation or welding procedure, and the excess of ribbon 22*a* is cut off. Due to the triangular cross-section of the mandrel, the plate 16 has a generally equilateral triangle shape with rounded corners and sides.

Each winding in the coil block 20 is made of a copper wire. Each coil may have a winding and a case insulation compatible with the working voltage and cooling system used. If air-cooling is used, a relatively thick insulation may be required. In case the transformer is immersed in oil, a thinner insulation may be used for the same voltage. Oil may be used for cooling as well as for insulation between the windings.

The cross-sectional area of the column 18 and the corresponding area on the plates 14 and 16 are defined by the ferromagnetic property of the amorphous alloy these parts are made of, and by the transformer working voltage. The height of each column 18 and the distance between the columns is derived from the dimensions of the coil blocks 20, according to the cross-sectional area of the wires, the number of turns and the required insulation. The dimensions of the plates 14 and 16 are such as to form a base for the whole cross-sectional area of all the columns 18, when the columns 18 are located at the required distance therebetween. This allows the passage of the magnetic flux from the columns 18 to the plates 14 and 16.

In the present example, each of the toroids 14, 16, 18*a*, 18*b* and 18*c* is made of amorphous ribbon of about 20 mm in width and 25 μm in thickness. It should, however, be noted that he toroids 18*a*, 18*b* and 18*c* may be made from ribbons in the range of 10–100 mm wide, or as allowed by the ribbon manufacturing process.

Figure 4:
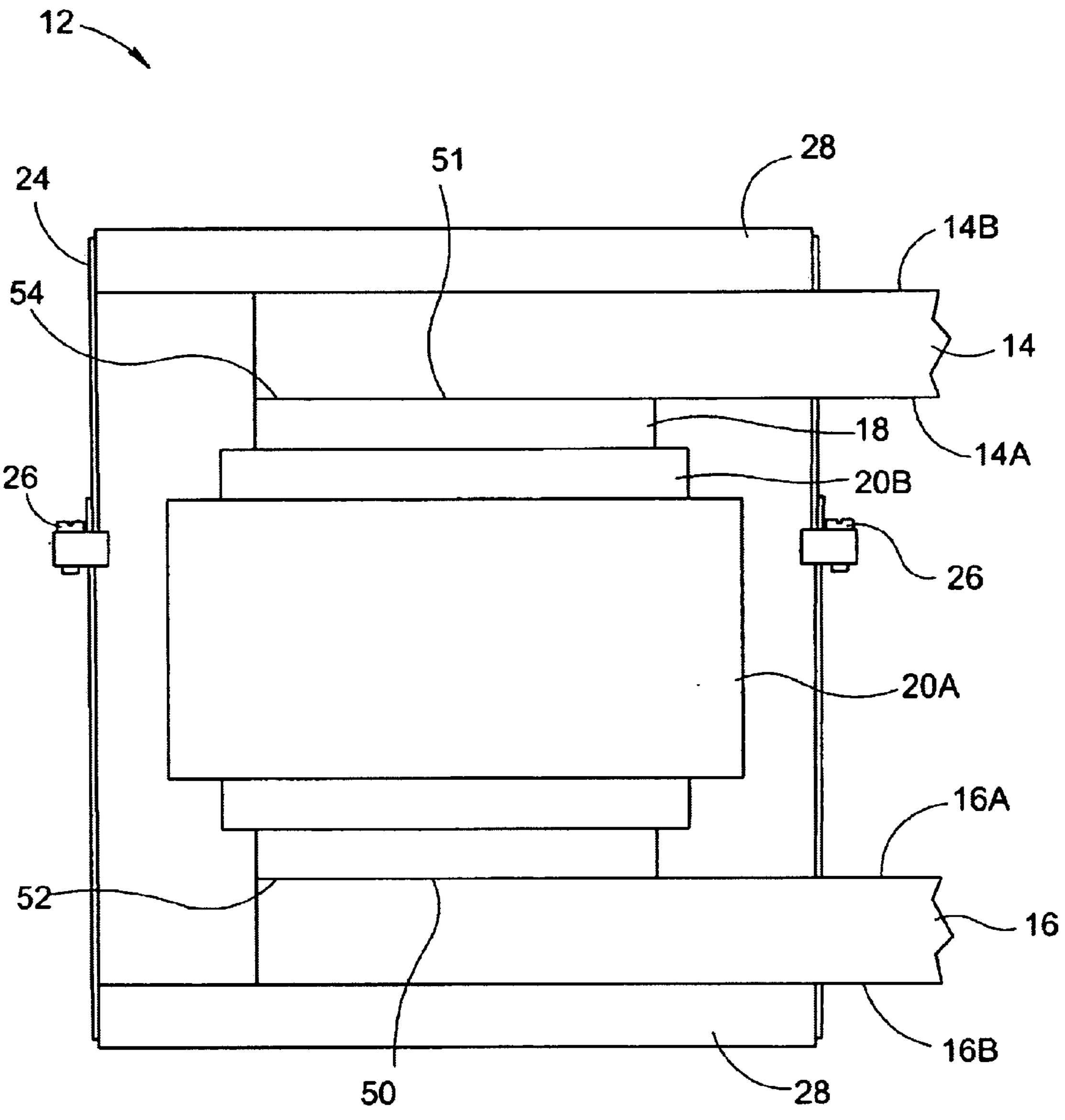
FIGS. 4 and 5 illustrate more specifically some constructional parts of the three-phase transformer of FIGS. 1–2, showing two possible examples, respectively, of assembling means for assembling the transformer.

FIG. 4 more specifically illustrates the column 18 of the magnetic core 12 of the transformer and means for assembling the transformer. The column 18 is mounted between the upper and lower plates 14 and 16. The primary and secondary winding 20*a* and 20*b* of the coil block 20 are mounted on the column 18. The structure is held together with the de-mountable bands 24 which are tightened with the screws 26. The structural member 28 is located between the band 24 and each of the plates 14 and 16. The de-mountable bands 24, screws 26 and structural members 28 constitute together the assembling means. It should be noted that the type and size of the assembling means could depend on the dimensions and rated power of the transformer.

As the inner (upper) surface 16*a* of the plate 16 comes in contact with a lower surface, 50 of the columns 18 to transfer the magnetic fluxes in the transformer, a narrow air gap 52 may be created therebetween. The width of the gap 52 may, for example, be about 0.2 mm. This gap 52 should preferably be filled with a magnetic paste, to improve the overall ferromagnetic property of the magnetic loop, namely to decrease the magnetic resistance. The magnetic paste may include an amorphous powder with soft ferromagnetic properties, having particle size larger than 20 μm, and a binding insulating material like transformer oil or epoxy resin. The concentration of the amorphous powder in the paste is usually between 50% and 90%. Any other suitable means can be used to minimize the gap 52 and its influence on the magnetic loop. An outer (lower) surface 16*b* of the plan 16 may be formed with a protective coating.

Similarly, a narrow air gap 54 may be created between a surface 14*a* of the element 14 and an upper surface 51 of the column 18. The gap 54 should also be filled with a magnetic paste. An outer (upper) surface 14*b* of the plate 14 should preferably also be formed with a protective coating.

Figure 5:
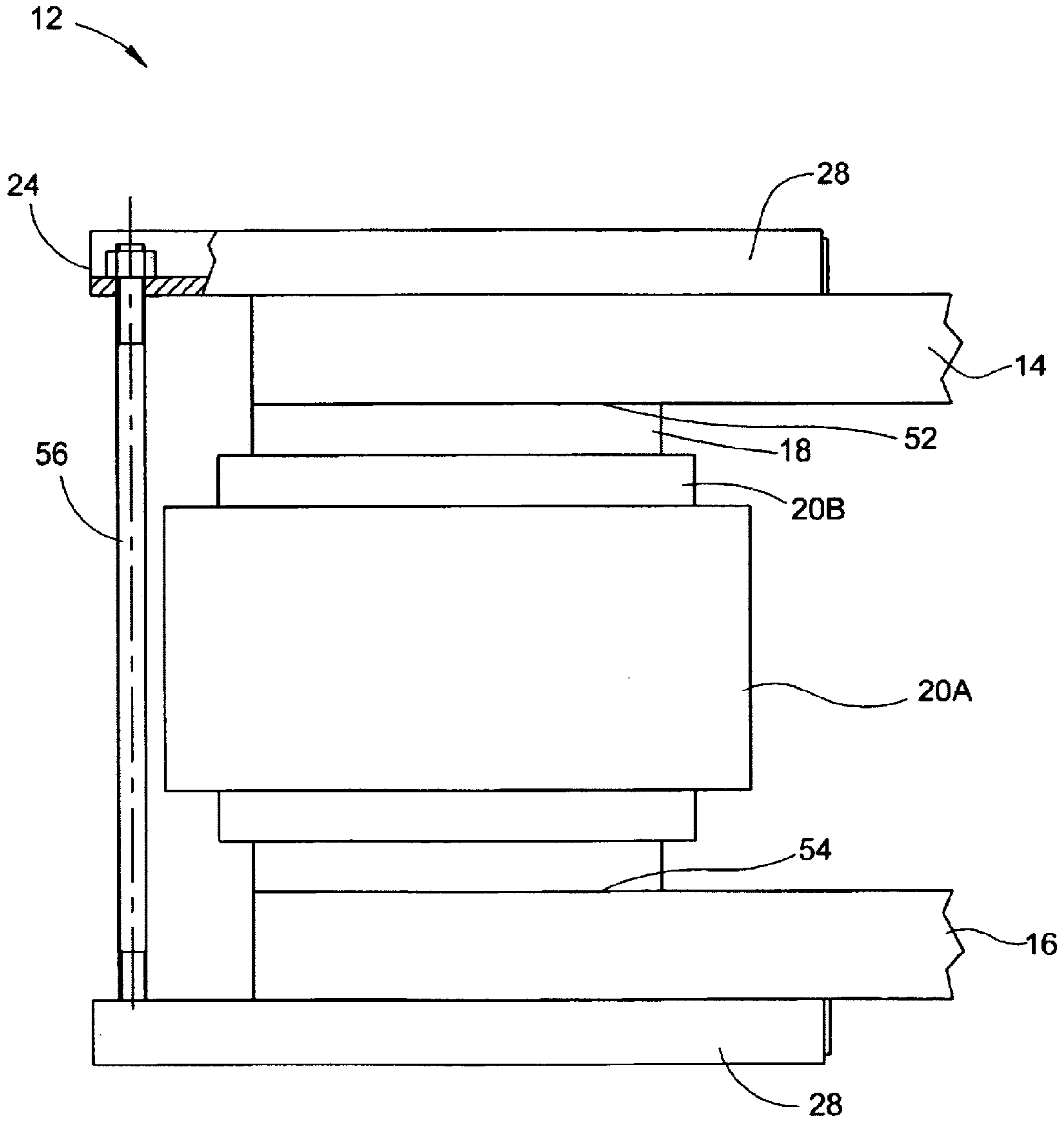

FIG. 5 illustrates one of the columns 18 of the magnetic circuit 12 associated with a somewhat different assembling means, as compared to that of the example of FIG. 4. To facilitate understanding, the same reference numbers are used for identifying those components, which are identical in the examples of FIGS. 4 and 5. Here, the upper and lower plates 14 and 16 and the column 18, are held together by a threaded beam or screw 56. The structural members 28 that are attached to each of the plates 14 and 16 include means adapted for the thread and nut structure.

Figure 6:
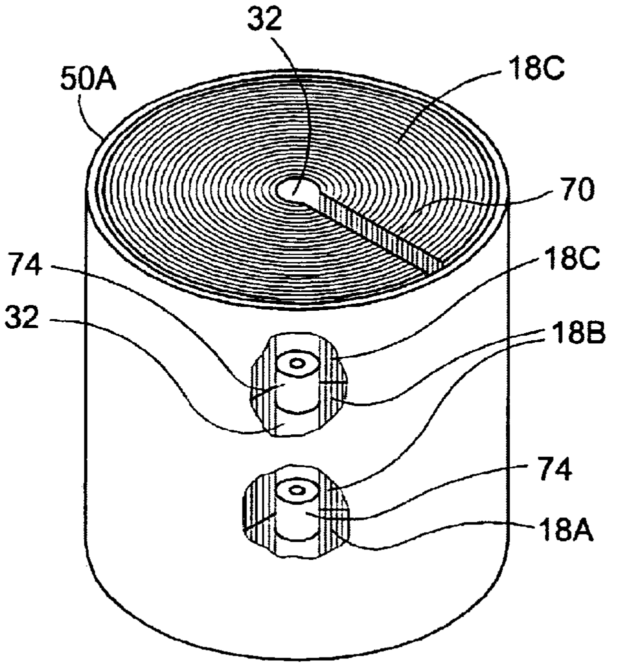
FIG. 6 more specifically illustrates the structure of the elementary magnetic circuit of the transformer of FIGS. 1–2, utilizing a plurality of toroids.

It is important to note that, when manufacturing transformers of various power, one comes into conflict caused by the absence of strips made of amorphous materials with arbitrary width, and by the need for a magnetic circuit element having the height much larger than the strip's width. Reference is made to FIG. 6, more specifically illustrating the structure of the column-like elementary circuit 18. In the present example, the column 18 is formed by the three toroids 18*a*, 18*b* and 18*c*. It should, however, be understood that the column 18 could be in the form of a single toroid. All the toroids 18*a*, 18*b* and 18*c* (or the single toroid) are formed with the central hole 32. An outer cover 50*a* of the toroid is preferably made of an insulating material, for example, a glass-cloth laminate impregnated with an epoxy resin. The toroids 18*a* 18*b* and 18*c* are made of amorphous ribbon, and have a radial slot 70 to decrease losses and to prevent high voltages from being induced into the windings of the toroids. Such a high voltage may cause breakdown of the insulation between the adjacent layers of the toroid. The radial slot 70 may, for example, be of 1 mm in width, or of any other appropriate width for a specific transformer design. The slot 70 may be made with a corundum disk (not shown) of 200 mm diameter and 0.5–1 mm thickness, using a cooling liquid and the toroid secured in a suitable fixture. The slot 70 is filled with an insulating material, for example a glass-cloth-base laminate. In the present example, cylinders 74 made of an insulating material are inserted into the hole 32, so as to align together the toroids 18*a*–18*b* and 18*b*–18*c*. The cylinders 74 may have a central hole, to allow the insertion of a threaded beam (not shown).

One of the parameters characterizing the operation of a transformer is the idle current. This value depends on the characteristics of the magnetic materials used and the values of the air gaps 52 and 54 (FIG. 4) between the separate parts of the magnetic circuit The affect of the air gap can be reduced in the following manner:

The air gaps 52 and 54 are filled with a magnetic paste or with a spacer is made of plastic having a filler of magneto-conductive powders, for example, amorphous iron-based powders. The thickness of such a spacer may, for example, be 0.1–0.2 mm. The induction in the air gap is reduced, which can be achieved by increasing the cross sectional area of the air gap, through which the magnetic flux passes, by several times.

To achieve better mechanical strength, the lateral surface of the column is coated with glass-cloth-base laminate band impregnated with epoxy resin that is wound about the column. After coating, the band is sintered at the temperature of about 100–130° C. To provide sufficiently good magnetic properties and allow for fitting the elements close to each other (when assembling the column), the upper and lower surfaces of the column lay be milled and polished to within 0.1 mm, with the total length of the column being set to within a 0.1 mm tolerance. To prevent stratification of the column during the machining process, it is necessary to chuck the operated zone in a special fixture.

Figure 7:
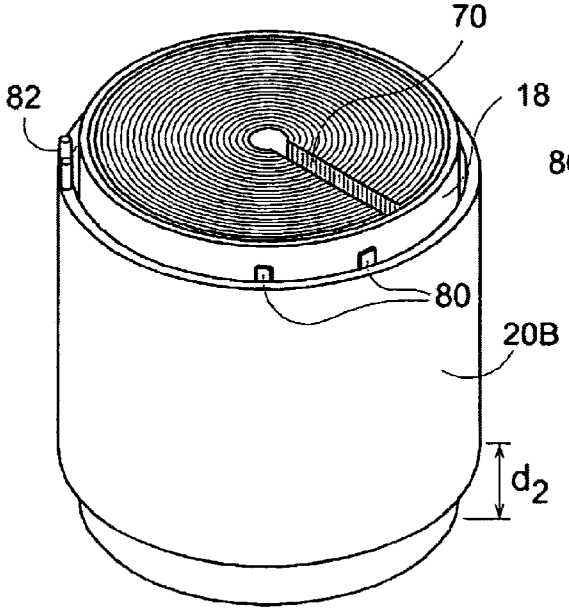
FIGS. 7 and 8 illustrate two stages in a method of assembling the structure of the element magnetic circuit of the transformer of FIGS. 1–2.
Figure 8:
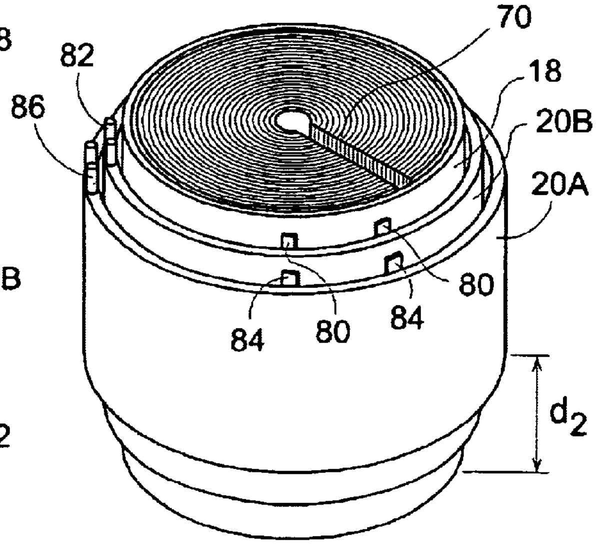

FIGS. 7 and 8 illustrate the main principles of assembling the transformer 10. FIG. 7 shows the structure of the column 18 after mounting the first coil of the coil block 20 (i.e., the secondary winding 20*b*) thereon. Spacers 80 made of an insulating material are used to mechanically attach the winding 20*b* to the column 18, while keeping the parts electrically insulated from each other. Terminals 82 of the winding 20*b* are exposed to allow electrical connections thereto. During the formation of the structure, a specific distance $d_1$ is kept between the lower end of the winding 20*b* and the lower end of the column 18. The structure is symmetrical, having the same distance $d_1$ at the upper end of the winding 20*b*.

FIG. 8 shows the transformer 10 with both primary and secondary windings 20*a* and 20*b* of the coil block 20 mounted thereon. The primary winding 20*a* is secured to the secondary winding 20*b* by spacers 84. The spacers 80 and 84 are made of an insulating material. Terminals 82 and 86 are used to connect the secondary and primary winding 20*b* and 20*a*, respectively, to a power source and load (not shown).

Thus, the entire assembling procedure is performed in the following manner. The coil of the secondary winding 20*b* is mounted on the column 18 and secured thereon with the spacers 80. Then, the coil of the primary winding 20*a* is mounted on that of the secondary winding 20*b* and secured thereon with spacers 82, the coil 20*a* being located in such a manner as to keep a predefined distance $d_2$ from each of the ends of the column 18. The coils of the other two phases are mounted on the corresponding columns 18 in a similar manner.

Turning back to FIG. 2, the plate 16 is set in a horizontal position with the working surface 16*a* pointing upwards. This working surface is the planar surface of the toroid 16 that was previously cleaned from the excess of the impregnating material and, optionally, polished.

Thereafter, a layer of the magnetic paste, having the thickness about 0.2 mm, is deposited on the plate 16 in the areas where the columns 18 are to be mounted. The three columns 18 with coil blocks thereon are mounted on the plate 16 symmetrically about the central axis CA. Then, another layer of the magnetic paste, having the thickness about 0.2 mm, is deposited onto the upper surfaces of the columns 18, and the upper plate 14 is mounted on the three columns 18 to complete the structure.

As described above, the elements 14, 16 and 18 of the magnetic circuit 12 are secured to each other using three de-mountable bands 24 with the screws 26 to tighten each band. The structural members 28 made of an insulating material are located between the bands 24 and the plates 14 and 16. The screws 26 are rotated so as to tighten the bands, thus securing the transformer parts together. Rotating the screws 26 in the opposite direction can easily dismantle the transformer. The bands 24 become loose and allow the removal of the columns 18 and the plates 14 and 16. Each coil can be then removed from its column, if desired.

The above technique allows for multiple cycles of dismantling/assembling the transformer, without causing any damage to the constructional parts of the transformer. This may facilitate the repair of the transformer, and may save work and materials needed therefor.

Various parts of the transformer may be separately and concurrently produced, and then assembled together in the final step. The entire method of manufacturing the transformer consists of the following.

Initially, the amorphous ribbons 22 are produced from an alloy having soft ferromagnetic properties, as will be described more specifically Her below. Then, the elements (e.g., toroids) 14, 16, 18 of the magnetic circuit 12 are produced. Each column-like elementary circuit 18 may comprise one or several toroids, according to the required height of the column 18 and the width of each toroid. In the case that the column 18 includes several toroids, each of the columns is assembled from these toroids. The coil block 20 is assembled (in the above-described manner), each including the primary and secondary windings 20*a* and 20*b*. Alternatively, each winding may be separately produced and assembled as a separate unit. Each of the fixed column-like toroids is then formed with a radial slot, which is filled with an insulating material. Then, the impregnation and/or coating of the elements and/or windings are carried out. To assemble the transformer from the so-produced elements, the columns 18 are inserted into the corresponding coil blocks 20, the coils are secured in place, the columns 18 are mounted at the corners of the plate 16, and the plate 14 is mounted on the columns 18. All the constructional parts 14, 16 and 18 are secured together using screws, tension bands or similar mechanical means.

The preparation of the amorphous ribbon toroids will now be described. At present, to obtain sufficiently good magnetic properties, the as-cast amorphous ribbons are annealed at a temperature of about 350–550° C. The disadvantage of this known method is that the amorphous ribbons become extremely brittle after annealing, usually breaking under mechanical stress or during winding of a toroid. To overcome this deficiency when manufacturing a transformer core (toroidal like magnetic circuit) from the amorphous ribbons, the present invention utilizes the following preparation scheme:

An as-cast amorphous alloy ribbon is coated with an insulating layer. The thickness of the two-sided insulation needs to be no more than about 5 $\mu$m. It should, however, be noted that for a low-voltage transformer, this stage may be omitted;

Then, a toroid (like the toroids 14, 16, 18) is wound from the as-cast ribbon. Since the magnetic circuit is composed of two "flat" toroids 14 and 16, and three vertical magnetic cores 18 configured like toroids, when the required height of the toroid exceeds the width of an amorphous ribbon available in the market, the toroid is to be wound by packages of ribbons. When the required height L of a toroid is equal to the width of the available amorphous ribbon, the conventional winding procedure can be used, namely, spiral-like winding of a toroid.

A mandrel made of a non-magnetic material is typically used for winding a magnetic core. Generally, the mandrel may be in the form of a triangular flat element with rounded edges, or in the form of a tube. However, when dealing with a high power transformer, the tube-like mandrel is preferably used, and for winding of vertical toroids 18 the mandrel has to be a tube. The height of the tube-mandrel is equal to that of the obtained toroid, and the diameter of the tube-like mandrel depends on the dimensions of the transformer and is determined by electrical calculations. When staring the winding process, the end of an amorphous ribbon is fixed to the tube by an insulating material, and when finishing the winding, the remaining end of tie ribbon is fixed to the last winding of the toroid in a similar manner.

When manufacturing high-power tansformers, the height of each of toroids 14, 16 and 18 typically exceeds the width of the commercially available amorphous ribbon. Therefore, in this case, the winding procedure should be carried out by means of rib on packages. Such a package is composed of n ribbons placed one on top of the other, such at an upper ribbon is shifted (displaced) with respect to the underneath ribbon along the ribbon's width. Such a displacement is usually in the range 1–8 mm, and is determined in accordance with technological parameters of the transformer and with acceptable induction in the ribbon, namely, from the ratio between the values of saturation and working induction.

The need for such ribbon packaging is associated with the fact that, when placing one amorphous ribbon adjacent to the other (along the central as of the toroid), an air gap (typically of about 0.5–2 mm) is formed between the two adjacent ribbons. The ribbon packages based winding is thus used to enable the passage of a magnetic flux (which propagates vertically in the toroid 18 and partly in toroids 14 and 16)

from a first ribbon to the second neighboring one spaced from the first ribbon by the air gap.

As the selected value of working induction may, for example, be $B_W$=1.35T at the maximal induction value (saturation) of $B_{sat}$=1.55T, then the induction reserve in each ribbon can reach 0.2T. Therefore, when forming a toroid from the packages of ribbons, where adjacent ribbons aligned along the central axis of the toroid are spaced from each other by an air gap, the magnetic flux would pass over this air gap, thereby passing from ribbon to ribbon. In this case, the magnetic flux in each ribbon should not exceed the induction value of $B_{sat}$=1.55T, and, therefore, n parallel ribbons should be located in the zone of the air gap, wherein $n \geqq B_W/(B_{sat}-B_W)$. In the present example of the above values of $B_W$ and $B_{sat}$, the number n of ribbons in the package should be not less than 7. In other words, for the amorphous ribbons available in the market, the number n of ribbons in the package is selected to be equal to 7. The toroid is thus wound by the 7-ribbon package.

Since the height (length) of the toroid is significantly higher than the ribbon's width, then N packages should be aligned along the height of the toroid, wherein N=L/b. Here, L is the height of the toroid and b is the width of the ribbon. It should be noted that each of the "flat" toroids 14 and 16', as well as each of the vertical toroids 18, is wound by identical ribbon packages, i.e., with the same number n of ribbons in the package (7 ribbons in the present example), while the number N of packages (aligned along the height of the toroid) is different for the flat and vertical toroids.

Figure 9A:
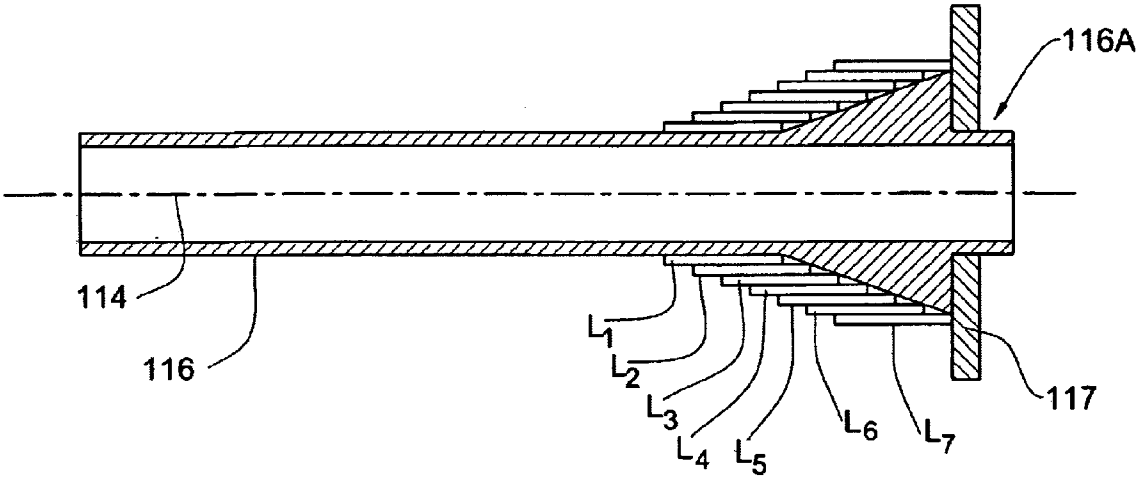
FIGS. 9A to 9D illustrate the principles of a ribbon package based technique of winding a transformer core suitable to be used in the three-phase transformer according to the invention.

The principles of such ribbon package based winding technique will now be described with reference to FIGS. 9A–9D. As shown in FIG. 9A, a tube-like mandrel 116 (of the length slightly exceeding the desired length of the toroid) is fixed in a winding machine (not shown) for rotation about the central axis 114 of the mandrel. In the present example, the mandrel has an outer diameter of 30 mm, a wail thickness of 2 mm, and the height of (L+20 mm), wherein L is the height of the toroid. A disc 117 is placed at one end of the mandrel (right end 116A in the present example), in order to prevent the "creeping" of the ribbons along the axis of the mandrel. The surface of the mandrel 116 at the end 116A has a conic shape, and the first package $S_1$ of ribbons (containing n ribbons—seven ribbons $L_1$–$L_7$ in the present example) is fixed at this end, for example, by gluing. From this end of the mandrel, all along its length, N packages of ribbons (not shown) are aligned. As a result, an n-layer structure is obtained with the length slightly exceeding the length of the toroid. The outer diameter of the toroid (14, 16 and 18) is determined from the electrical calculation.

Figure 9B:
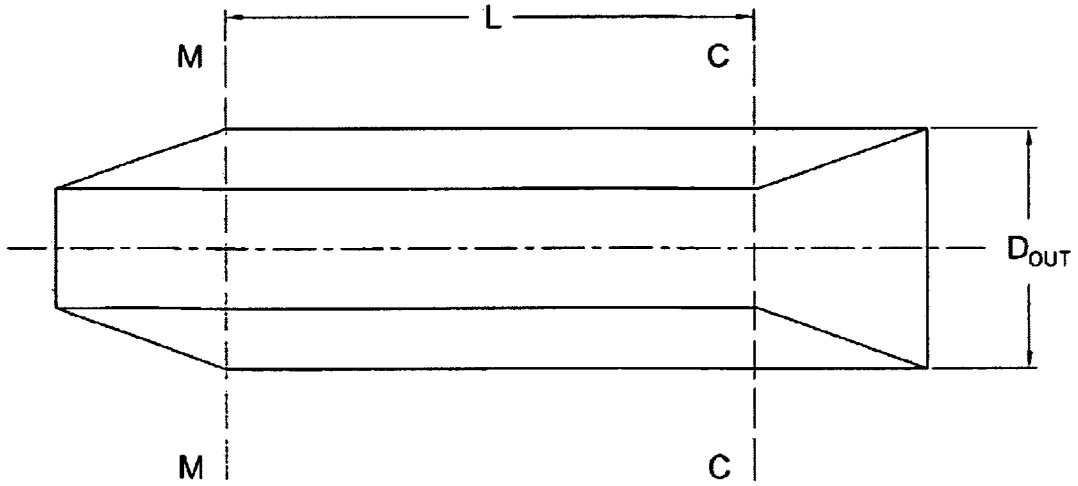
Figure 9C:
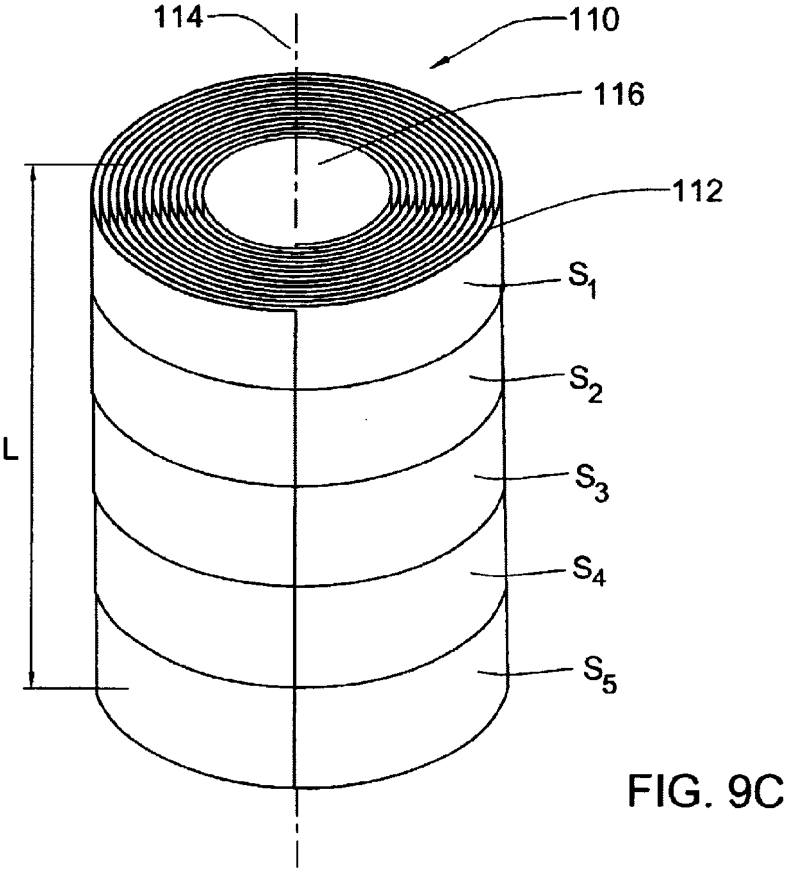

The revolution of the mandrel until the diameter of the toroid reaches the required value, results in a multi-layer structure shown in FIG. 9B, wherein $D_{out}$ is the outer diameter of the toroid, and L is the calculated length thereof. Thereafter, two sections are made across the toroid along lines C—C and M—M (FIG. 9B), thereby cutting off conical portions and obtaining a calculated toroid 110 of FIG. 9C having the multi-layer structure 112 shown in FIG. 9D.

Figure 9D:
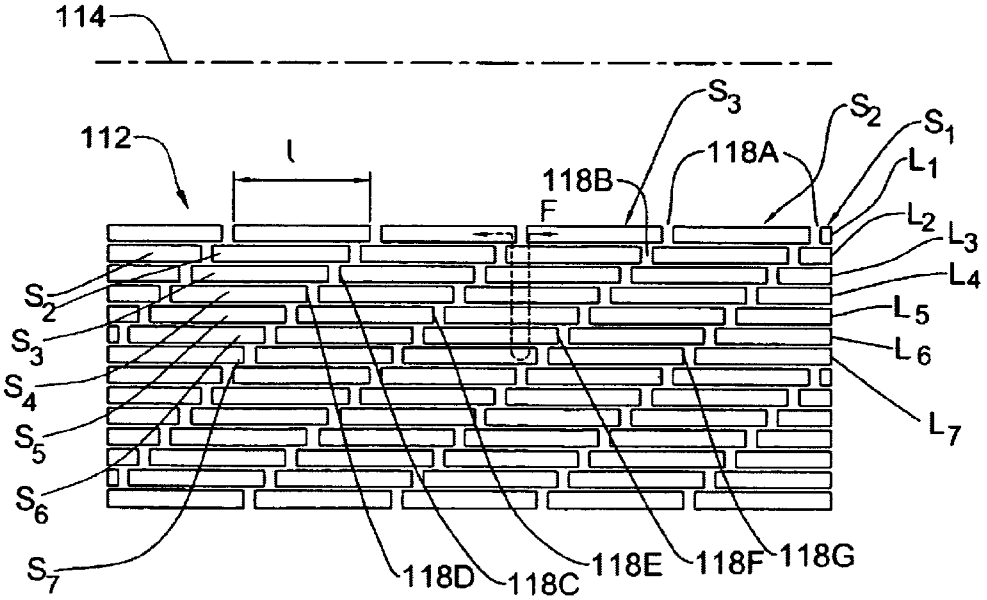

Thus, the transformer core 110 is in the form of a cylindrically shaped toroid of the desired (calculated) height L. The toroid 110 is formed by winding the multi-layer structure 112 of magnetic strips (ribbons) about the central axis 114 of the mandrel 116 (constituting a central axis of the toroid). The multi-layer structure 112 is composed of N packages (five such packages $S_1$–$S_5$ being shown in the example of FIG. 9C) aligned along the length (axis) of the toroid, each package being a stack of n parallel layers of n amorphous ribbons (seven ribbons $L_1$–$L_7$ in the present example as shown in FIG. 9D), which are arranged along an axis perpendicular to the central axis 114 (i.e., along the radius of the toroid). This arrangement results in that the air gaps 118A–118G (formed between each two adjacent ribbons and being typically about 0.5–2 mm) are aligned along the length of the toroid (along the axis 114). By shifting the n ribbons (7 in the present example) in the package with respect to each other in a direction along the width of the strip is such that each of the air gaps is overlapped by (n−1) strips of the other layers (6 strips in the present example). It should be understood that the number of ribbons in the package, which defines the thickness of the winding, is defined by the required power of the transformer.

The transformer having the magnetic circuit 12 (FIG. 1) in the form of two flat toroids 14 and 16 and three vertical toroids 18, each having the structure 112, operates in the following manner. Magnetic fluxes 46 and 48 enter the magnetic circuit 12, and are combined into the common magnetic flux 36. Such a magnetic flux enters the butt-end of the toroid 18 (having the structure 112 of FIG. 9D), and is divided into separate concentric fluxes passing through each ribbon layer $L_1$–$L_7$, such that each unit of flux F (FIG. 9D) passes from package to package within the zone of the air gap. For example, the magnetic flux F while passing in the ribbon layer $L_1$ reaches the air gap 118A and passes into the parallel ribbons $L_2$–$L_7$ of the same package. Having passed through these ribbons a distance up to the next air gap in the path of the flux F (i.e., the air gap 118A of the second package $S_2$), the flux F returns to the ribbon layer $L_1$ of the first package $S_1$, where it propagates along the axis 114 up to the next air gap 118A. Here, the flux turns to again pass the entire package $S_1$ along the axis perpendicular to the central axis 114. By this, the magnetic flux passes the entire length of the toroid 18 (FIG. 1) and enters the upper flat toroid 14.

It should be noted that, if the toroid 18 is formed of several toroidal elements, then to force the layers of the toroidal elements to be laid exactly on top each other, the mandrel may have cheeks or delimiters mounted thereon. Using this scheme, the variation in toroid's width may be limited to a small value, for example about ±0.2 mm.

When the transformer core (toroid) is manufactured as described above, the last layer of the toroid is secured to the adjacent layer to prevent the toroid from folding. This may be achieved, for example, by using resistance welding.

Thereafter, the complete toroid is annealed at a temperature of about 350–550° C., preferably in a furnace with controlled atmosphere, for a desired time period defined by the type of metal. The toroid may be annealed with the mandrel still inserted therein. Annealing may be performed with or without the application of an external magnetic field (longitudinal or transverse) to the toroid.

Then, the toroid is impregnated with an organic binding material, for example, an epoxy resin in a vacuum chamber or in an ultrasonic bath. After the impregnation the toroid is placed in temperature-controlled environment. The impregnation may be performed with the mandrel still in the toroid.

The mandrel is removed from the toroid. The excess of an impregnation material is removed from the planar surfaces of the toroid, or at least the surface of one of the elements 14 and 16. The working surfaces (areas used to transfer the magnetic flux) may be polished to obtain planar surfaces for good flux transfer and low magnetic resistance. The ends of the toroid may be made parallel to within 0.2 mm. It should be noted, that the polishing procedure can be performed prior to the step of an annealing, while the toroid already has a fixed shape, and the amorphous ribbon is not yet brittle and is thus more workable.

As described above with reference to FIG. 6, the radial slot 70 is cut in the toroid 18. The Slot 70 may be made with a corundum disk (not shown) of a 200 mm diameter and 0.5–1 mm thickness, for example, by using a cooling liquid and with the toroid secured in a suitable fixture. The slot 70 is preferably filled with an insulating material, for example, a glass-cloth-base laminate.

To achieve better mechanical strength, the lateral circular area of the toroid is coated with a glass-cloth-base laminate band that is wound about the toroid. After the coating procedure, the band is sintered at the temperature of about 100–130° C.

It should be noted that the above-described ribbon package based technique is suitable for manufacturing the transformer core from amorphous ribbons limited to those available in the marker (i.e., having insufficient width for covering the entire height of the core). Generally, all the magnetic circuits in the transformer could be manufactured from silicone steel, in which case the ribbon package based winding technique may not be used. Although the use of silicon steel ribbons leads to the increased losses in the magnetic circuit, it enables to simplify the technological process, owing to the fact that a strip of the required width can be selected for manufacturing the toroid. Therefore, the above construction utilizing silicone steel can be used in the applications having reduced requirements to the effectiveness of the transformer.

The technological process of the manufacture of the magnetic circuit from silicone steel consists of the following:

The toroidal plate (14 and 16) is wound from the strip produced from silicone steel having, for example, the width of 0.3 mm and an insulating coating of 3–10 $\mu$m thickness. In this case, the coefficient of the winding density lies in the range of 0.8–0.96. The width of the strip corresponds to the height of the toroidal plate.

After the winding procedure, the plate is impregnated by an insulating varnish, e.g., vacuum or ultrasound impregnation. The vanish solidifies at the temperature of 80–105° C.

A bandage made of a glass-strip is wound along the perimeter of the plate, and then impregnated by epoxide varnish with further thermo-treatment at the temperature of 80–105° C.

The working surface of the plate is treated, e.g., milled, for obtaining a plane with the unevenness value not exceeding 10 $\mu$m.

The column like elementary circuits 18 can be manufactured similar to the toroidal plates 14 and 16. When using the toroid manufacturing technology, the width of the strip is selected to be larger than the height of the column on the allowance value of mechanical treatment, e.g., 2 mm. The mechanical treatment of both butt-ends of the column 18, in distinction to that of the plate 14 and 16, is performed with the unevenness value not exceeding 10 $\mu$m and the unparallelism of the butt-ends not exceeding 20 $\mu$m. Moreover, the longitudinal slot 70 (e.g., of 1 mm in thickness) is made, and a plate (not shown) made of an insulating material, for example glass-textolite (resin-dipped fabric laminate), is inserted into the slot 70. A bandage made of a glass-strip is wound on the outer surface of the column, and then impregnated by epoxide varnish with further thermo-treatment at the temperature cf 80–105° C.

Following are the calculation results corresponding to the transformer of 400 kVA power made of amorphous ribbons and having the above design of assembling the separate parts of the magnetic circuit 12 to each other:

the cross sectional area of the column-like elementary circuit, $S_{core}$=293 $cm^2$;

the surface area of the projections having the height of 6 mm in at the butt-end of the column, $S^1$=469 $cm^2$;

the butt-end surface area of the projections, $S^2$=150 $cm^2$;

the total area on the projections, along which the magnetic flux passes, $S_\Sigma$=619 $cm^2$.

In this case, for magnetic induction, we have:

$$B_\delta = \frac{B_m \cdot S_{core}}{S_\Sigma}$$

wherein $B_m$ is the induction in the column. When $B_m$=1.3 (T), $B_\delta$=(1.3×293)/619=0.61(T), which results in the reduction of idle current by two. When selecting the depth of the recess equal to 12 mm, the idle current reduces by 4.

Mathematical analysis of a three phase transformer made according to the present invention was performed, and results were compared to those for a conventional transformer having an "E+1" magnetic circuit structure. The evaluation relates to the three-phase transformer having rated power values of 10 kVA, 25 kVA, 100 kVA and 630 kVA. The analysis includes computation of the core and winding electrical losses and weight. All calculations were performed for a fixed, predefined value of overall efficiency. Calculation results are presented below in Tables 1 to 5.

In all the examples presented in the tables 1–5, the working frequency f is 50 Hz. Following are the variables in the tables 1–5:

$P_w$, wherein W is the winding loss;

magnetic circuit loss $P_{Fe}$ (W);

winding weight $G_w$ (kg);

magnetic circuit weight $G_{Fe}$ (kg);

total transformer weight $G_{tr}$ (kg);

efficiency $\eta$ (%), transformer height $B_{tr}$ (mm);

transformer length $L_{tr}$ (mm);

transformer width $B_{tr}$ (mm);

transformer volume $V_{tr}$ ($m^3$);

output power $P_2$ (kVA);

primary voltage $U_1$ (V);

secondary voltage $U_2$ (V)

TABLE 1

| $P_2$ = 10 kVA; $U_2$ = 220 V; $U_1$ = 380 V | | |
|---|---|---|
| | Type of transformer | |
| Parameters | AMT, dry - Israel | TSZM-10/0.4 |
| Core design | Toroid | E + 1 type |
| Core material | Amorphous metal | Silicon steel |
| $P_w$ (W) | 330 | 256 |
| $P_{Fe}$ (W) | 12 | 78 |
| $G_W$ (KG) | 26 | 59 |
| $G_{Fe}$ (kG) | 58 | 40 |
| $G_{tr}$ (KG) | 85 | 99 |
| $\eta$ (%) | 96.7 | 96.7 |
| $H_{tr}$ (mm) | 214 | 465 |
| $L_{tr}$ (mm) | 349 | 600 |
| $B_{tr}$ (mm) | 349 | 335 |
| $V_{tr}$ ($m^3$) | 0.026 | 0.093 |

TABLE 2

| $P_2$ = 25 kVA; $U_2$ = 220 V; $U_1$ = 380 V | | |
|---|---|---|
| | Type of transformer | |
| Parameters | AMT, dry - Israel | TSZM-25/0.4 |
| Core | Toroid | E + 1 type |
| Core material | Amorphous metal | Silicon steel |
| $P_w$ (W) | 697 | 558 |
| $P_{Fe}$ (W) | 19.3 | 157 |
| $G_W$ (KG) | 64.5 | 133 |
| $G_{Fe}$ (kG) | 95.5 | 77 |
| $G_{tr}$ (KG) | 160 | 200 |
| η (%) | 97.2 | 97.2 |
| $H_{tr}$ (mm) | 242 | 555 |
| $L_{tr}$ (mm) | 441 | 706 |
| $B_{tr}$ (mm) | 441 | 463 |
| $V_{tr}$ ($m^3$) | 0.047 | 0.18 |

TABLE 3

| $P_2$ = 100 kVA; $U_2$ = 380 V; $U_1$ = 22.5 kV | | |
|---|---|---|
| | Type of transformer | |
| Parameters | AMT dry - Israel | Siblok, dry |
| Core design | Toroid | E + 1 type |
| Core material | Amorphous metal | Silicon steel |
| $P_w$ (W) | 2024 | 1700 |
| $P_{Fe}$ (KG) | 48 | 440 |
| $G_W$ (kG) | 132 | 160 |
| $G_{Fe}$ (kG) | 238 | 405 |
| $G_{tr}$ (KG) | 371 | 565 |
| η (%) | 97.9 | 97.9 |
| $H_{tr}$ (mm) | 706 | 1180 |
| $L_{tr}$ (mm) | 1270 | 1300 |
| $B_{tr}$ (mm) | 1270 | 925 |
| $V_{tr}$ ($m^3$) | 1.13 | 1.41 |

TABLE 4

| $P_2$ = 630 kVA; $U_2$ = 380 V; $U_1$ = 22.5 kV | | |
|---|---|---|
| | Type of transformer | |
| Parameters | AMT dry - Israel | Siblok, dry |
| Core design | Toroid | E + 1 type |
| Core material | Amorphous metal | Silicon steel |
| $P_w$ (W) | 7071 | 5600 |
| $P_{Fe}$ (W) | 136 | 1600 |
| $G_W$ (KG) | 650 | 570 |
| $G_{Fe}$ (kG) | 683 | 1740 |
| $G_{tr}$ (KG) | 1333 | 2310 |
| η (%) | 98.87 | 98.87 |
| $H_{tr}$ (mm) | 866 | 1850 |
| $L_{tr}$ (mm) | 766 | 1820 |
| $B_{tr}$ (mm) | 766 | 1186 |
| $V_{tr}$ ($m^3$) | 0.51 | 4.05 |

TABLE 5

| $P_2$ = 630 kVA; $U_2$ = 380 V; $U_1$ = 22.5 kV | | |
|---|---|---|
| | Type of transformer | |
| Parameters | AMT, dry - Israel | Allied Signal, Oil, USA |
| Core design | Toroid | E + 1 type |
| Core material | Amorphous metal | Amorphous metal |
| $P_w$ (W) | 5880 | 5835 |

TABLE 5-continued

| $P_2$ = 630 kVA; $U_2$ = 380 V; $U_1$ = 22.5 kV | | |
|---|---|---|
| | Type of transformer | |
| Parameters | AMT, dry - Israel | Allied Signal, Oil, USA |
| $P_{Fe}$ (W) | 148 | 186 |
| $G_W$ (KG) | 537 | 487 |
| $G_{Fe}$ (kG) | 739 | 932 |
| $G_{tr}$ (KG) | 1276 | 1419 |
| η (%) | 99.05 | 99.05 |
| Oil | – | + |
| Tank | – | + |

The computations for the transformers having various power ratings and voltage levels indicate the advantageous features of the transformer constructed according to the present inventions including among others the following features:

decrease of total weight by about 14% to 43%;

decrease in cost by about 3%–22%;

decrease in transformer volume by about 20% to 87%.

An experimental transformer manufactured according to the present invention has the following parameters:

$P_2$=1 kVA; $U_1$=380V; $U_2$=220V; $f$=50 Hz; η=92.66%; $G_{tr}$=16.4 kg

It was found that this transformer has good maintainability, and the above-described modular structure thereof enables its easy dismantling and reassembling, while the conventional transformer of the kind specified has the following characteristics: η=91% and $G_{tr}$=20 kg. It is thus evident that the structure according to the invention enables to achieve the 18% decrease in the transformer weight at higher efficiency.

Figure 10:
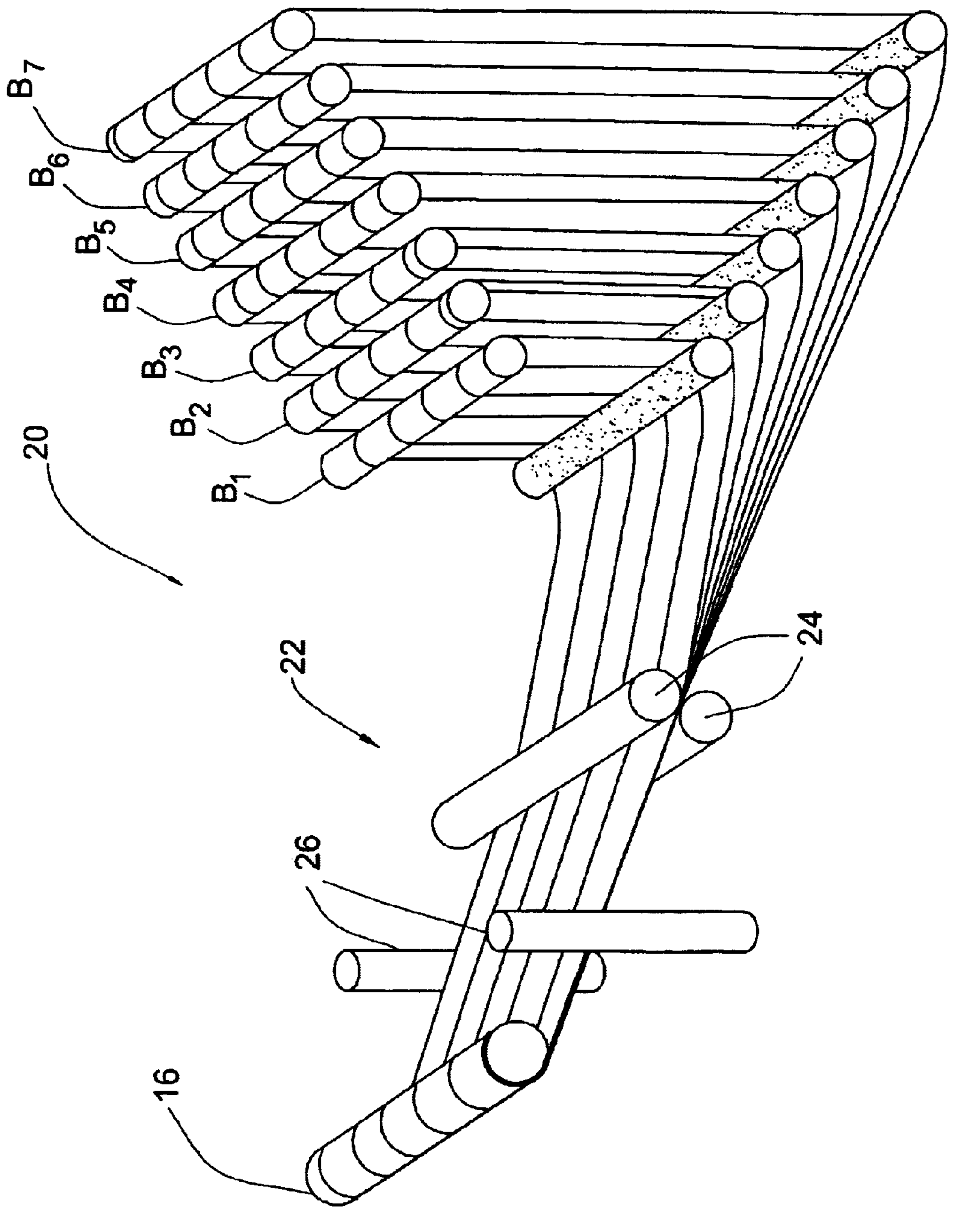
FIG. 10 schematically illustrates the main components of an apparatus for manufacturing the transformer core composed of ribbon packages.

FIG. 10 illustrates the main components of an apparatus 120 for manufacturing the transformer core 110. The apparatus 120 comprises seven bobbins $B_1$–$B_7$ (generally, n bobbins), each for carrying N strips of a corresponding ribbon layer to be fed to the mandrel 116. The strips are previously wound onto the bobbins in a manner, which will be described further below, and simultaneously fed onto the mandrel 116, by a suitable driving assembly, which is not specifically shown.

The driving assembly may be of any known suitable kind, and may be associated with the mandrel 116 for driving the revolution thereof, while the bobbins are rotatably mounted on their shafts (not shown) to rotate against the tension of the feeding layers. In order to provide the desired tension of the layers during the coiling procedure, the driving assembly may also be associated with the shafts of bobbins for driving the revolution thereof. The construction may be such that the bobbins are driven together for rotation about the mandrel, which, in this case, is mounted stationary.

Further provided in the apparatus 120 is a guiding assembly 122, comprising one or more guiding rollers, generally at 124, and a pair of width limiting rollers 126 accommodated at opposite ends of the mandrel 116 extending normally to the direction of movement of the layers onto the mandrel.

As further shown in the figure, the layers are prepared on the bobbins with the corresponding shift between the strips of each two adjacent layers as described above. To this end, either the corresponding arrangements of strips of different layers are previously determined, and the strips are wound on the bobbins accordingly, or identically wound bobbins are prepared and then cut by any suitable cutting tool.

It should be noted, although not specifically shown, that the layers of sufficient width, appropriately shifted with respect to each other, could be wound on the mandrel, and the so produced core then cut at opposite ends. In this case, the bobbing and/or guiding means may be appropriately shifted.

Those skilled in the art will readily appreciate that various modifications and changes can be applied to the preferred embodiments of the invention as hereinbefore exemplified without departing from its scope defined in and by the appended claims.

What is claimed is:

1. A method for manufacturing a three-phase transformer, the method comprising the steps of:

(i) producing two substantially plate-like elements of a magnetic circuit of the transformer in the form of toroids by winding at least one magnetic strip;

(ii) producing each of three column-like elementary circuits of said magnetic circuit in the form of toroid of a multi-layer structure by winding predetermined number N of packages of magnetic strips about a central axis of the toroid, each package being composed of a predetermined number n of layers formed by n strips placed on top of each other;

(iii) forming each of the columns with a radial slot filled with an insulating material;

(iv) mounting a coil block on each of the columns obtained in step (iii) to form the corresponding one of the three phases of the transformer;

(v) mounting the coil blocks carrying columns between the plate-like elements in a spaced-apart parallel relationship of the column-like toroids, such as to form a spatial symmetrical structure about a central axis of the transformer, spacers between the elements of the magnetic circuit of the transformer being filled with a material containing a magnetic powder.

2. The method according to claim 1, wherein the magnetic strips are made of an amorphous material.

3. The method according to claim 2, and also comprising the steps of:

annealing each of the plate-like toroids in a magnetic field directed perpendicular to a central axis of the plate-like toroid, and carrying out impregnation of each of the annealed plate-like toroids with an organic binding material;

prior to performing step (iii) annealing each of the three columns in a magnetic field directed along the central axis of the column, and carrying out impregnation of each of the annealed columns with an organic binding material.

4. The method according to claim 1, wherein said strips are made of silicon steel.

5. The method according to claim 1, wherein the N packages are aligned along said central axis of the toroid with air gaps existing between each two adjacent strips, the n strips being placed on top of each other and being aligned along an axis perpendicular to said central axis, the strips in the package being shifted with respect to each other a predetermined distance in a direction along said central axis of the toroid such that each of the air gaps is overlapped by (n−1) strips aligned along the axis perpendicular to the central axis of the toroid.

6. The method according to claim 5, wherein the number N of packages is defined by a width of the strip and a desired length of the toroid, such that the sum of the widths of the N strips in each layer is substantially equal to the length of the toroid, and the number n of the strips in the package is selected in accordance with the magnetic properties of the strips.

7. The method according to claim 6, wherein the number n of the layers satisfies the following relation: $n \geqq B_w/(B_{sat}-B_w)$, wherein n is integer, $B_w$ is a working value of a magnetic induction, and $B_{sat}$ is a saturation value of the magnetic induction in the strip.

8. The method according to claim 6, wherein the winding of the multi-layer structure comprises the steps of:

preparing each of the n layers from the N strips with the air gaps existing between each two adjacent strips in the layer; and simultaneously winding said n layers about a central axis of a mandrel supporting the toroid during the manufacture, by simultaneously feeding the N strips of each layer, such that the layers are shifted with respect to each other said predetermined distance in the direction along said central axis, each of the air gaps in one layer being thereby overlapped by (n−1) strips of the other layers of the structure.

9. The method according to claim 8, wherein the preparation of each of the layers comprises winding the N strips on a bobbin such that the sum of the width of the strips is substantially equal to said desired height, the bobbins being aligned in a spaced-apart parallel relationship, such that the layers on the bobbins are shifted with respect to each other said predetermined distance in the direction along the axis of the bobbin.

10. The method according to claim 1, wherein each of the column-like toroids is produced by mounting several toroidal elements on top of each other, each of said toroidal elements being produced by the winding of the strips.

11. The method according to claim 1, wherein each of the plate-like toroids is a multi-layer structure produced by the winding of a predetermined number of packages of the magnetic strips about a central axis of the plate-like toroid, the packages being aligned along said central axis with air gaps existing between each two adjacent strips, each package being composed of a predetermined number n of layers formed by n magnetic strips placed on top of each other and being aligned along an axis perpendicular to said central axis, the strips in the package being shifted with respect to each other a predetermined distance in a direction along said central axis of the toroid such that each of the air gaps is covered by (n−1) strips aligned along the axis perpendicular to the central axis of the toroid.

12. The method according to claim 11, wherein the number of packages is defined by a width of the strip and a desired length of the plate-like toroid, such that the sum of the widths of the strips in each layer, which is equal to the number of packages, is substantially equal to the length of the toroid, and the number n of the strips in the package is selected in accordance with the magnetic properties of the strips.

13. The method according to claim 12, wherein the number n of the layers satisfies the following relation: $n \geqq B_w/B_{sat}-B_w)$, wherein n is integer, $B_w$ is a working value of a magnetic induction, and $B_{sat}$ is a saturation value of the magnetic induction in the strip.

14. The method according to claim 12, wherein the winding of the multi-layer structure comprises the steps of:

preparing each of the n layers from the number of strips equal to the number of packages, with the air gaps existing between each two adjacent strips in the layer; and simultaneously winding said n layers about a central axis of a mandrel supporting the toroid during the manufacture, by simultaneously feeding the strips of each layer, such that the layers are shifted with respect to each other said predetermined distance in the direction along said central axis, each of the air gaps in one layer being thereby overlapped by (n−1) strips of the other layers of the structure.

15. The method according to claim 14, wherein the preparation of each of the layers comprises winding the strips of the layer on a bobbin such that the sum of the width of the strips is substantially equal to said desired height of the plate-like strip, the bobbins being aligned in a spaced-apart parallel relationship, such that the layers on the bobbins are shifted with respect to each other said predetermined distance in the direction along the axis of the bobbin.

16. A three-phase transformer manufactured by the method of claim 1.

* * * * *